Patented Mar. 12, 1940

2,193,674

UNITED STATES PATENT OFFICE 2,193,674

POLYCYCLIC CONDENSATION PRODUCTS AND INTERMEDIATE PRODUCTS THEREOF

Gerhardt Haberland, Breslau, Germany, assignor to Winthrop Chemical Company, Inc., New York, N. Y., a corporation of New York No Drawing. Application July 23, 1938, Serial No. 221,013. In Germany July 23, 1937

19 Claims. (Cl. 260—239)

This invention relates to polycyclic condensation products, to certain intermediate products thereof and to a process of preparing the same.

Processes for the manufacture of tetracyclic compounds of the sterol group have already been described. The known syntheses, however, can be carried out only difficultly and with insufficient yields.

The present invention provides for a process for the manufacture of such tetracyclic compounds which has the advantage of greater simplicity as compared with the known processes; it further provides for the possibility of preparing polycyclic compounds with an angular alkyl group, particularly methyl group.

In accordance with the present invention tetracyclic condensation products and the intermediate products required for their manufacture are prepared by starting with a γ-(naphthyl-1)-butyric acid halide, reacting upon the said halide with diazo methane to form the corresponding diazo ketone, transforming the said diazo ketone by the action of a hydrohalic acid into the corresponding halogen methyl ketone and condensing the latter with a metal compound, preferably an alkali metal compound, of malonic-, cyanoacetic- or aceto acetic acid ester to form the corresponding ketonic acid esters. The latter may be saponified to the carboxylic acids and these or their esters subjected to ring closure by means of condensing agents, such as sulfuric acid. The acids may also be subjected to ring closure in the form of the acid halides, for instance, in the presence of tin tetrachloride or aluminium chloride. The said reaction proceeds, for instance, in accordance with the following reaction scheme:

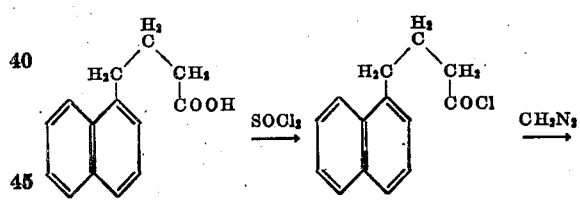

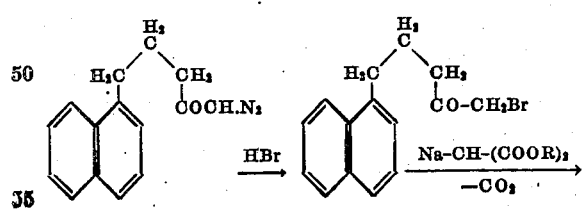

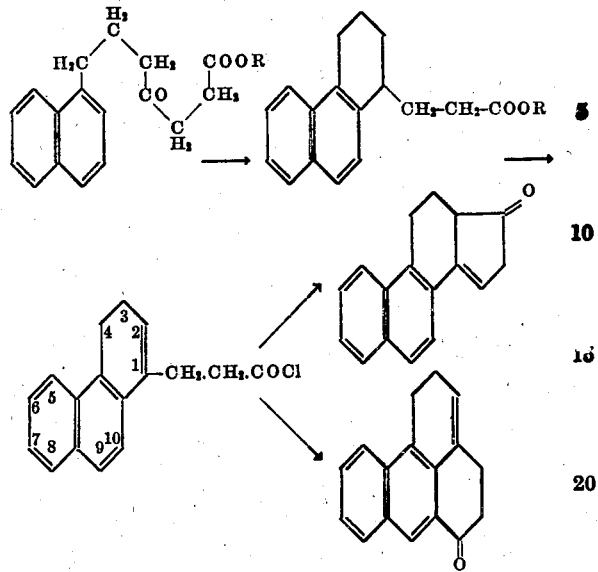

Accordingly, γ-(naphthyl-1)-butyric acid halides are reacted with diazo methane; the diazo ketones are transformed into the corresponding halogen methyl ketones by treatment with a hydrohalic acid, such as hydrochloric acid, but preferably hydrobromic acid; the said halogen methyl ketones are condensed with a metal-malonic acid ester or a metal-aceto-acetic acid ester, so that a ketonic acid ester is formed. On saponification, preferably by means of alkalies, the corresponding ketonic acid is obtained; when malonic acid ester has been used for the condensation, a bicarboxylic acid is formed from which one carboxylic acid group is split off, for instance by heat treatment. For further condensation the keto-carboxylic acid may be directly condensed, in which case probably a lactone of a 2-hydroxy-phenanthrene-1-propionic acid is formed, or the keto-carboxylic acid is subjected to condensation in the form of its ester, in which case a dihydrophenanthrene-1-propionic acid ester is formed. The latter may be saponified and is then preferably subjected to further condensation in the form of its acid halide, for instance, in the presence of tin tetrachloride. A tetracyclic ketone is then obtained which either is a ketone of the cyclopentano-phenanthrene series or a ketone of the benzo-anthracene series.

The process of the invention may be carried out with various derivatives of the γ-(naphthyl-1)-butyric acid, for instance, the naphthalene ring may be partially hydrogenated or may be substituted, for instance, by alkoxy groups, particularly the methoxy and ethoxy group; also the butyric acid radical may be substituted by alkyl radicals. As to the manufacture of tetracyclic compounds which show a physiological activity similar to that of certain sexual hormones, the reaction of γ-(6-alkoxy-naphthyl-1)-α-methyl-butyric acid in the above described manner is of particular interest. In this case, after the alkoxy group finally has been saponified, a tetracyclic hydroxy ketone is obtained which preferably corresponds to one of the following formulae:

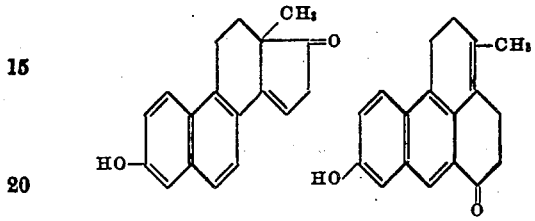

The said condensation product is characterized by a high oestrus activity which may be established even with a few gamma (0.001 mg.) of the said product.

Hereinafter the manufacture of the said condensation is described by way of example, the invention is, however, not limited thereto:

5 grams of gamma-(6-methoxynaphthyl-1)-alpha-methylbutyric-acid are treated with thionylchloride in chloroform solution and the excess thionylchloride is removed, for the most part, under diminished pressure, after the reaction is complete. The remaining yellow acid chloride is treated with excess diazomethane in ethereal solution at 0° C., whereupon the diazoketone of the formula

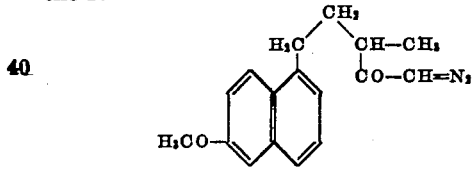

is formed. After two hours standing, a mixture of equal parts of ether and 48% aqueous hydrobromic acid is added at 0° C. while stirring. The mixture is stirred for two to three hours, the ethereal solution is then shaken with water and dilute caustic soda lye, dried by means of sodium sulphate and the ether evaporated. A light yellow oil is obtained which substantially consists of the product of the formula:

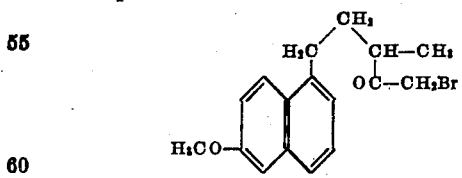

This product is boiled with the calculated quantity of sodium malonic acid ethyl ester in toluene solution; after about 30–60 minutes the condensation is completed. The solvent is then evaporated under diminished pressure and the residue saponified and decarboxylated by heating. The acid of the formula

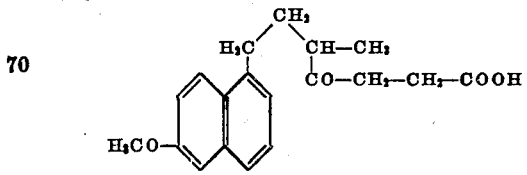

is thus obtained. It is converted into its methyl ester by treatment with an ethereal solution of diazo methane. The ester obtained distills at 190–200° C. under 0.1 mm. pressure. The acid obtained from the ester by alkaline saponification is obtained in crystals upon treatment with ether. After recrystallization from ether, benzine or aqueous methanol the acid is obtained in crystals melting at 88° C. It dissolves in concentrated sulphuric acid with red coloration; the condensation product obtained thereby is precipitated with water; it melts at 198° C. and has probably the formula

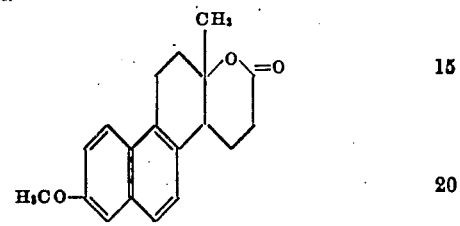

The methyl ester obtained by means of diazo methane from the above-mentioned acid may also be treated as follows:

0.6 gram of the ester is dissolved in 2.5 ccms. of glacial acetic acid and this solution treated with a mixture of 5 ccms. of glacial acetic acid and 5 ccms. of concentrated sulphuric acid at 10° C. for ½ hour. The mixture is then diluted with icewater and the reaction product extracted by means of ether. The ethereal solution is washed neutral, the ether evaporated and the residue recrystallized from benzine and dilute acetone. The 2-methyl-7-methoxy-3.4-dihydrophenanthrene-1-propionic acid methyl ester of the formula

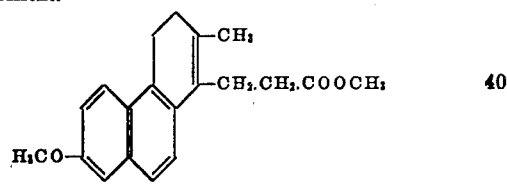

is thus obtained in brilliant leaflets melting at 137° C.

0.25 gram of this ester is boiled in 10 ccs. of methanol with 0.5 gram of barium hydroxide in 10 ccs. of water for 30 minutes. The barium salt separates rapidly; it is filtered with suction, washed with water until the alkaline reaction has disappeared and then with hot alcohol. 0.1 gram of barium salt is treated in 5 ccs. of carbon disulfide with 0.2 gram of phosphorus pentachloride. The barium salt is thereby rapidly digested, only small quantities of gelatinous, inorganic barium salts remain undissolved. The solution is filtered, diluted with 10 ccs. of carbon disulfide and treated with 2 ccs. of tin tetrachloride in 2 ccs. of carbon disulfide. After standing for 3 hours at 20° C. the solution is decomposed with hydrochloric acid and extracted with ether. The residue, after twice redissolving from methanol, forms thin yellow needles of the ketone formed, having one of the above indicated formulae but having a methoxy group in the 7-position. They melt at 168–170° C. The dinitrophenyl-hydrazone forms dark red, almost black flakes. The product obtained on demethylation of the methoxy group by heating with a mixture of equal parts of glacial acetic acid and hydrobromic acid (spec. grav. 1.7) shows oestrus activity in a small dose of some gamma.

When starting with γ-(6-methoxy-naphthyl-1)-butyric acid chloride the bromomethyl ketone, obtained in an analogous manner as described above, melts at 65° C., and the ketonic acid obtained therefrom by condensation with malonic acid ester, saponification and decarboxylation melts at 88° C. The latter yields condensation products analogous to those described above.

I claim:

1. In the process of preparing polycyclic condensation products, the step which comprises converting a compound selected from the group consisting of γ-(naphthyl-1)-butyric acid halides, their nuclear alkoxylated and hydrogenated derivatives and the side chain alkylated substitution products thereof by the action of diazo methane into the corresponding diazo ketone.

2. In the process of preparing polycyclic condensation products, the step which comprises converting a γ-(alkoxy-naphthyl-1)-butyric acid halide by the action of diazo-methane into the corresponding diazo ketone.

3. In the process of preparing polycyclic condensation products, the step which comprises converting a γ-(naphthyl-1)-α-methyl-butyric acid halide by the action of diazo-methane into the corresponding diazo ketone.

4. In the process of preparing polycyclic condensation products, the step which comprises converting γ-(6-methoxy-naphthyl-1)-α-methyl-butyric acid halide by the action of diazo-methane into the corresponding diazo ketone.

5. In the process of preparing polycyclic condensation products, the step which comprises converting γ-(6-methoxy-naphthyl-1)-α-methyl-butyric acid chloride by the action of diazo-methane into the corresponding diazo ketone.

6. The process which comprises reacting upon a compound selected from the group consisting of γ-(naphthyl-1)-butyric acid halides, their nuclear alkoxylated and hydrogenated derivatives and the side chain alkylated substitution products thereof with diazo methane, converting the group, —CH=N$_2$, of the diazo ketone formed by the action of a hydrohalic acid into the group, —CH$_2$—halogen, condensing the halogen compound obtained with a compound selected from the group consisting of metal compounds of malonic, cyano acetic and aceto acetic esters, and subjecting the ester compound obtained to saponification.

7. The process which comprises reacting upon a γ-(alkoxy-naphthyl-1)-butyric acid halide with diazo-methane, converting the group, —CH=N$_2$, of the diazo ketone formed by the action of a hydrohalic acid into the group, —CH$_2$-halogen, condensing the halogen compound obtained with a compound selected from the group consisting of metal compounds of malonic, cyano acetic and aceto acetic esters, and subjecting the ester compound obtained to saponification.

8. The process which comprises reacting upon a γ-(naphthyl-1)-α-methyl-butyric acid halide with diazo-methane, converting the group, —CH=N$_2$, of the diazo ketone formed by the action of a hydrohalic acid into the group, —CH$_2$—halogen, condensing the halogen compound obtained with a compound selected from the group consisting of metal compounds of malonic, cyano acetic and aceto acetic esters, and subjecting the ester compound obtained to saponification.

9. The process which comprises reacting upon a γ-(alkoxynaphthyl-1)-α-methyl-butyric acid halide with diazo-methane, converting the group, —CH=N$_2$, of the diazo ketone formed by the action of a hydrohalic acid into the group, —CH$_2$—halogen, condensing the halogen compound obtained with a compound selected from the group consisting of metal compounds of malonic, cyano acetic and aceto acetic esters, and subjecting the ester compound obtained to saponification.

10. The process which comprises reacting upon a γ-(6-alkoxynaphthyl-1)-α-methyl-butyric acid halide with diazo-methane, converting the group, —CH=N$_2$, of the diazo ketone formed by the action of a hydrohalic acid into the group, —CH$_2$—halogen, condensing the halogen compound obtained with a compound selected from the group consisting of metal compounds of malonic, cyano acetic and aceto acetic esters, and subjecting the ester compound obtained to saponification.

11. The process which comprises reacting upon a γ-(6-alkoxynaphthyl-1)-α-methyl-butyric acid chloride with diazo-methane, converting the group, —CH=N$_2$, of the diazo ketone formed into the group, —CH$_2$Br by the action of hydrobromic acid, condensing the bromine compound formed with a compound selected from the group consisting of metal compounds of malonic, cyano acetic and aceto acetic esters, and subjecting the ester compound obtained to saponification.

12. The process which comprises reacting upon a γ-(6-alkoxynaphthyl-1)-α-methyl-butyric acid halide with diazo-methane, converting the group, —CH=N$_2$, of the diazo ketone formed by the action of a hydrohalic acid into the group, —CH$_2$—halogen, condensing the halogen compound obtained with malonic acid ester, saponifying the condensation product, splitting off one carboxylic acid group from the dicarboxylic acid obtained, esterifying the remaining mono-carboxylic acid, subjecting the ester to condensation under the action of concentrated sulfuric acid at a temperature of about 10° C. to a 2-methyl-7-alkoxy-3,4-dihydro-phenanthrene-1-propionic acid methyl ester, saponifying the latter, converting the acid obtained into the acid halide, acting upon the latter with stannic chloride and saponifying the alkoxy group of the condensation product formed.

13. The compounds of the formula:

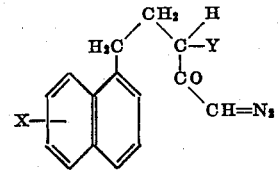

wherein X stands for one of the substituents hydrogen and alkoxy and Y stands for one of the substituents hydrogen and alkyl.

14. The compounds of the formula:

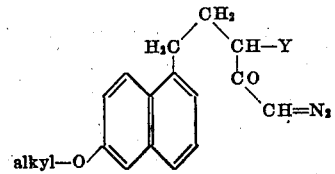

wherein Y stands for one of the substituents hydrogen and alkyl.

15. The compounds of the formula:

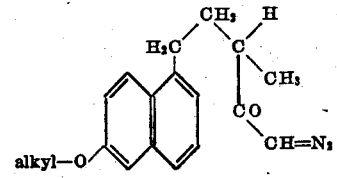

16. The compounds of the formula:

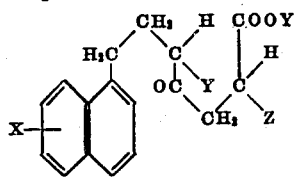

wherein X stands for one of the substituents hydrogen and alkoxy, Y stands for one of the substituents hydrogen and alkyl, Z stands for one of the substituents hydrogen and —COOY.

17. The compounds of the formula:

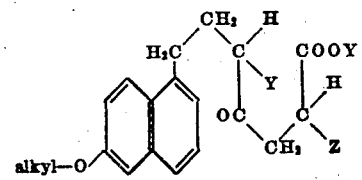

wherein Y stands for one of the substituents hydrogen and alkyl, Z stands for one of the substituents hydrogen and —COOY.

18. The compounds of the formula:

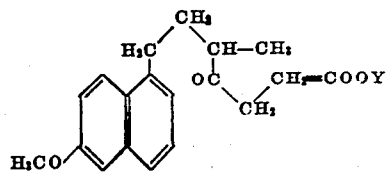

wherein Y stands for one of the substituents hydrogen and alkyl.

19. The polycyclic condensation product obtained in accordance with the process claimed in claim 12.

GERHARDT HABERLAND.